(12) United States Patent
Yogendra et al.

(10) Patent No.: US 12,471,497 B2
(45) Date of Patent: Nov. 11, 2025

(54) MAGNETIC TUNNEL JUNCTION DEVICE WITH MAGNETOELECTRIC ASSIST

(71) Applicant: INTERNATIONAL BUSINESS MACHINES CORPORATION, Armonk, NY (US)

(72) Inventors: Karthik Yogendra, Hillsboro, OR (US); Heng Wu, Guilderland, NY (US); Saba Zare, White Plains, NY (US); Dimitri Houssameddine, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 17/648,816

(22) Filed: Jan. 25, 2022

(65) Prior Publication Data

US 2023/0240148 A1 Jul. 27, 2023

(51) Int. Cl.
  *H10N 50/01* (2023.01)
  *G11C 11/16* (2006.01)
  (Continued)

(52) U.S. Cl.
  CPC ........... *H10N 50/01* (2023.02); *G11C 11/161* (2013.01); *H10B 61/00* (2023.02); *H10N 50/80* (2023.02); *G11C 11/1675* (2013.01)

(58) Field of Classification Search
  CPC .............................. H10B 61/00; G11C 11/1675
  See application file for complete search history.

(56) References Cited

U.S. PATENT DOCUMENTS 6,569,745 B2   5/2003   Hsu
6,865,105 B1   3/2005   Tran
(Continued)

FOREIGN PATENT DOCUMENTS

CN   105633275 A   6/2016
CN   107785481 A   3/2018
(Continued)

OTHER PUBLICATIONS

Nishtha Sharma et al., Magneto-Electric Magnetic Tunnel Junction Logic devices, 2015 Fourth Berkeley Symposium on Energy Efficient Electronic Systems (E3S), Berkeley, CA, USA, 2015, pp. 1-3 (Year: 2015).*

(Continued)

*Primary Examiner* — Shih Tsun A Chou
(74) *Attorney, Agent, or Firm* — Samuel A. Waldbaum

(57) ABSTRACT

A semiconductor device including a magnetic tunnel junction (MTJ) stack, a first metal line above the MTJ stack and a magnetoelectric material layer above the first metal line. A semiconductor device including an array of magnetic tunnel junction (MTJ) stacks, a first metal line connected physically and electrically to a top electrode of each MTJ stack in a row of the array of MTJ stacks and a magnetoelectric material layer above the first metal line, connected physically and electrically to the first metal line. A method including forming an array of magnetic tunnel junction (MTJ) stacks, forming a first metal line above a row of the array of MTJ stacks, and forming a magnetoelectric material layer above the first metal line, connected physically and electrically to the first metal line.

14 Claims, 13 Drawing Sheets

Section Y-Y

(51) Int. Cl.
  *H10B 61/00*   (2023.01)
  *H10N 50/80*   (2023.01)

(56) References Cited

U.S. PATENT DOCUMENTS

| | | | |
|---|---|---|---|
| 7,420,837 | B2 | 9/2008 | Hung |
| 8,830,734 | B2 | 9/2014 | Roelofs |
| 9,076,954 | B2 | 7/2015 | Khvalkovskiy |
| 9,276,040 | B1 | 3/2016 | Marshall |
| 9,620,562 | B2 | 4/2017 | Katine |
| 10,177,303 | B2 | 1/2019 | Sharma |
| 10,354,710 | B2 | 7/2019 | Petti |
| 2016/0274198 | A1* | 9/2016 | Naik .............. H10N 50/85 |
| 2018/0040810 | A1* | 2/2018 | Lee ............... G11C 11/16 |
| 2021/0242395 | A1 | 8/2021 | Wang |
| 2022/0068337 | A1* | 3/2022 | Prasad ............ H10B 61/00 |

FOREIGN PATENT DOCUMENTS

| | | |
|---|---|---|
| CN | 110707208 B | 1/2020 |
| WO | 2012159078 A2 | 11/2012 |
| WO | 2013090937 A1 | 6/2013 |
| WO | 2019005046 A1 | 1/2019 |
| WO | 2019005176 A1 | 1/2019 |
| WO | 2023/143046 A1 | 8/2023 |

OTHER PUBLICATIONS

Xianfeng Liang et al., Magnetoelectric materials and devices, APL Mater. 9, 041114 (2021) (Year: 2021).*

Notification of Transmittal of the International Search Report and the Written Opinion of the International Searching Authority, Or the Declaration, Date of mailing Mar. 24, 2023, Applicant's or agent's file reference F22W3238, International application No. PCT/CN2023/071547, 7 pages.

Ebnabbasi et al., "Magnetoelectric effects at microwave frequencies on Z-type hexaferrite", Applied Physics Letters 101, 062406 (2012), © 2012 American Institute of Physics, pp. 062406-1-062406-3.

Patel et al., "Field Driven STT-MRAM Cell for Reduced Switching Latency and Energy", © 2014 IEEE, pp. 2173-2176.

Pending U.S. Appl. No. 17/303,541, filed Jun. 2, 2021, entitled: "Magnetic Tunnel Junction Device With Air Gap", 39 pages.

Pending U.S. Appl. No. 17/304,179, filed Jun. 16, 2021, entitled: "Wide-Base Magnetic Tunnel Junction Device With Sidewall Polymer Spacer", 33 pages.

* cited by examiner

Section X-X

Section X-X

Section X-X

Section X-X

Section X-X

Section X-X

Section Y-Y

MAGNETIC TUNNEL JUNCTION DEVICE WITH MAGNETOELECTRIC ASSIST

BACKGROUND

The present invention relates, generally, to the field of semiconductor manufacturing, and more particularly to fabricating a magnetic tunnel junction device with a magnetoelectric assist.

Magnetoresistive random-access memory ("MRAM") devices are used as non-volatile computer memory. MRAM data is stored by magnetic storage elements. The elements are formed from two ferromagnetic layers, each of which can hold a magnetic field, separated by a spin conductor layer. One of the two layers is a reference magnet or a reference layer set to a particular polarity, while the remaining layer's field can be changed to match that of an external field to store memory and is termed the "free magnet" or "free-layer". This configuration is known as the magnetic tunnel junction (MTJ) and is the simplest structure for a MRAM bit of memory.

Challenges of accurately writing to individual MTJ memory devices increase with scaling of MTJ memory devices which reduces dimensions of the MTJ memory devices while increasing device density.

SUMMARY

According to an embodiment, a semiconductor device is provided. The semiconductor device including a magnetic tunnel junction (MTJ) stack, a first metal line above the MTJ stack and a magnetoelectric material layer above the first metal line.

According to an embodiment, a semiconductor device is provided. The semiconductor device including an array of magnetic tunnel junction (MTJ) stacks, a first metal line connected physically and electrically to a top electrode of each MTJ stack in a row of the array of MTJ stacks and a magnetoelectric material layer above the first metal line, connected physically and electrically to the first metal line.

According to an embodiment, a method is provided. The method including forming an array of magnetic tunnel junction (MTJ) stacks, forming a first metal line above a row of the array of MTJ stacks, and forming a magnetoelectric material layer above the first metal line, connected physically and electrically to the first metal line.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

Figure 1:
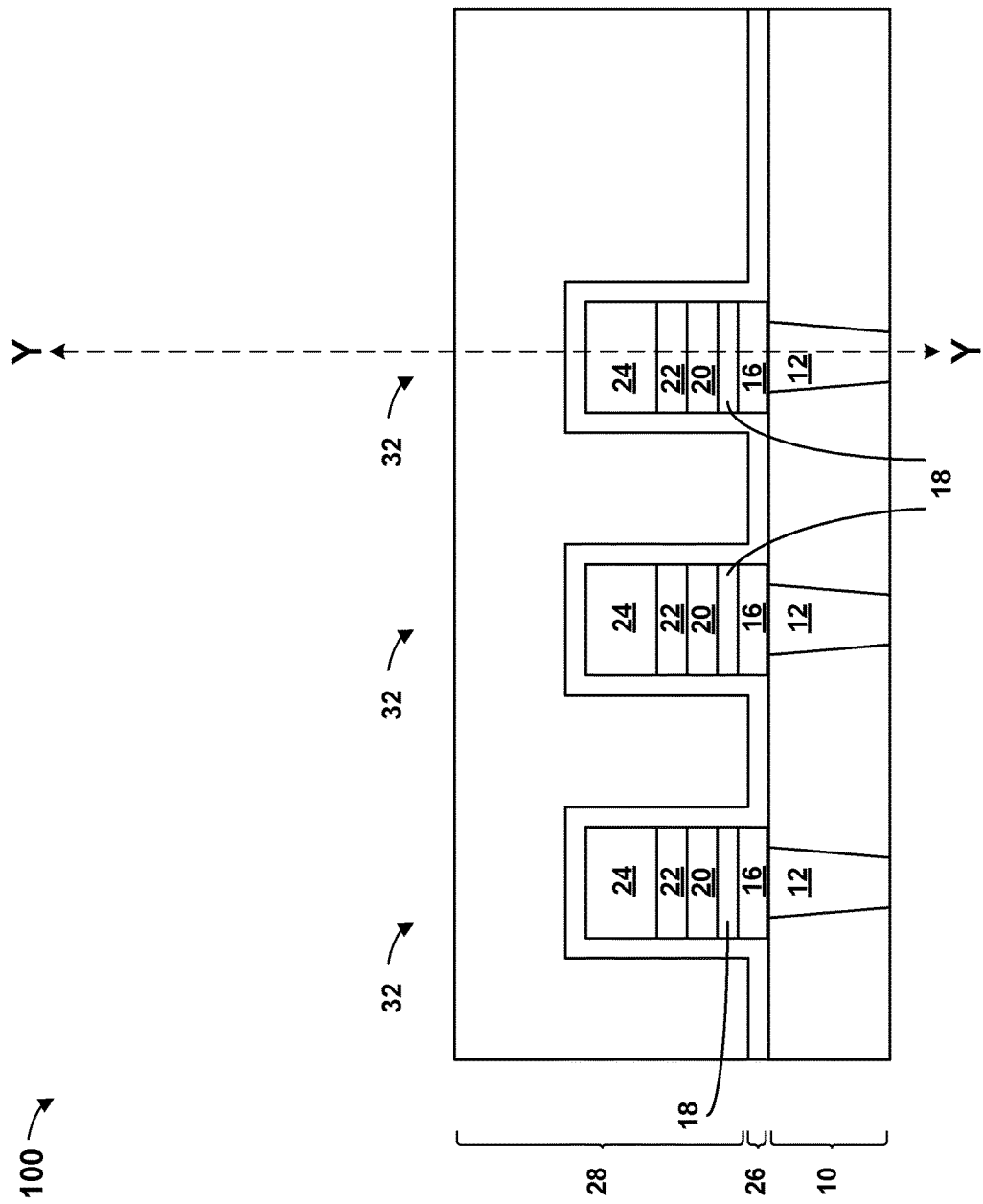
FIG. 1 Section X-X illustrates a cross-sectional view of a semiconductor structure along section line X-X, at an intermediate stage of fabrication, according to an exemplary embodiment.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

As stated above, magnetoresistive random-access memory (hereinafter "MRAM") devices are a non-volatile computer memory technology. MRAM data is stored by magnetic storage elements. The elements are formed from two ferromagnetic layers, each of which can hold a magnetic field, separated by a spin conductor layer. One of the two layers is a reference magnet or a reference layer set to a particular polarity, while the remaining layer's field can be changed to match that of an external field to store memory and is termed the "free magnet" or "free-layer". The magnetic reference layer may be referred to as a reference layer, and the remaining layer may be referred to as a free layer. This configuration is known as the magnetic tunnel junction (hereinafter "MTJ") and is the simplest structure for a MRAM bit of memory.

A memory device is built from a grid of such memory cells or bits. In some configurations of MRAM, such as the type further discussed herein, the magnetization of the magnetic reference layer is fixed in one direction (up or down, or alternatively right or left), and the direction of the magnetic free layer can be switched by external forces, such as an external magnetic field or a spin-transfer torque generating charge current. A smaller current (of either polarity) can be used to read resistance of the device, which depends on relative orientations of the magnetizations of the magnetic free layer and the magnetic reference layer. The resistance is typically higher when the magnetizations are anti-parallel and lower when they are parallel, though this can be reversed, depending on materials used in fabrication of the MRAM.

The present application relates to magnetoresistive random access memory (MRAM). More particularly, the present application relates to a magnetic tunnel junction (MTJ) structure with a magnetoelectric assist.

Challenges of accurately writing to individual MTJ memory devices increase with scaling of MTJ memory devices which reduces dimension of the MTJ memory devices while increasing device density. Write disturb is a critical challenge in today's MRAM technology and is known to increase with scaling and variations.

An MTJ structure with a magnetoelectric assist provides a novel design integrating a magnetoelectric effect as an assist in addition to spin torque. Spin torque is the fundamental driver for flipping of spin inside the free layer of the MTJ.

Manufacture of an MTJ structure with a magnetoelectric assist is compatible with current MRAM flow manufacturing methods.

An MTJ structure with a magnetoelectric assist includes an MTJ memory structure with an additional structure of a magnetoelectric material arranged within a crossbar of two metal lines. The additional structure may be formed above or below an array of MTJ memory structures. This allows for magnetoelectric material to be present at each cross point of the two metal lines. A voltage on the two metal lines can be managed to generate a magnetic field at each cross point. The magnetic field can be used to bias the magnetoelectric material. The magnetic field generated by magnetoelectric material can be used as an assist in MTJ switching to the conventional current-driven spin torque.

Advantages of the MTJ structure with a magnetoelectric assist includes a lower power requirement to generate a magnetic field to switch a polarity of the magnetic free layer within the MTJ structure, resulting in approximately of power needed to 1/40 of power needed in prior devices. This includes lower voltage and lower current requirements for switching of the magnetic free layer without comprising memory cell retention characteristics as devices are further scaled.

An additional advantage of the MTJ structure with a magnetoelectric assist includes more control of writing to the MTJ memory structure, both for a low to high resistance switching of the magnetic free layer and for high to low resistance switching of the magnetic free layer by providing a magnetic field above or below the MTJ memory structure which can be selectively turned off and on during a write operation to the MTJ memory device.

The MTJ structure with a magnetoelectric assist uses a dielectric instead of conductor to generate the magnetic field. Due to the unique property of the magnetoelectric dielectric material, magnetic field can be generated under an electrical field and persists. Compared with the oersted field generated by current in a conductor, the magnetic field generated by magnetoelectric assist requires significantly less power consumption.

The MTJ structure with a magnetoelectric assist device production includes formation of an MTJ structure in a pillar formation arranged in an array, a dielectric deposition, trench formation and metal line formation for a first electrode, covered by a magnetoelectric material layer in a first direction of the array, another dielectric deposition, a second trench formation and metal line for a second electrode in a second direction of the array, perpendicular to the first electrode, followed by via contact formation for the first electrode and for the second electrode, such that the first and the second electrodes form a crossbar architecture with magnetoelectric material at each crosspoint of the first and the second electrodes. Alternatively the MTJ structure in a pillar formation arranged in an array may be formed after the formation of the first electrode, magnetoelectric material layer and the second electrode.

The MTJ structure with a magnetoelectric assist device uses voltage between the first electrode and for the second electrode to generate the magnetic field in the magnetoelectric material layer at each crosspoint of the first and the second electrodes which align with a single MTJ memory device structure. The MTJ structure with a magnetoelectric assist device uses voltage only as there is no net current flowing through the magnetoelectric material layer.

The MTJ structure with a magnetoelectric assist device works well for both in-plane MTJ structures and for perpendicular MTJ structures.

The present invention relates, generally, to the field of semiconductor manufacturing, and more particularly to fabricating a MTJ structure with a magnetoelectric assist device. This MTJ structure with a magnetoelectric assist device can help control switching of a free layer in the MTJ structure with improved control and lower power usage.

Figure 2:
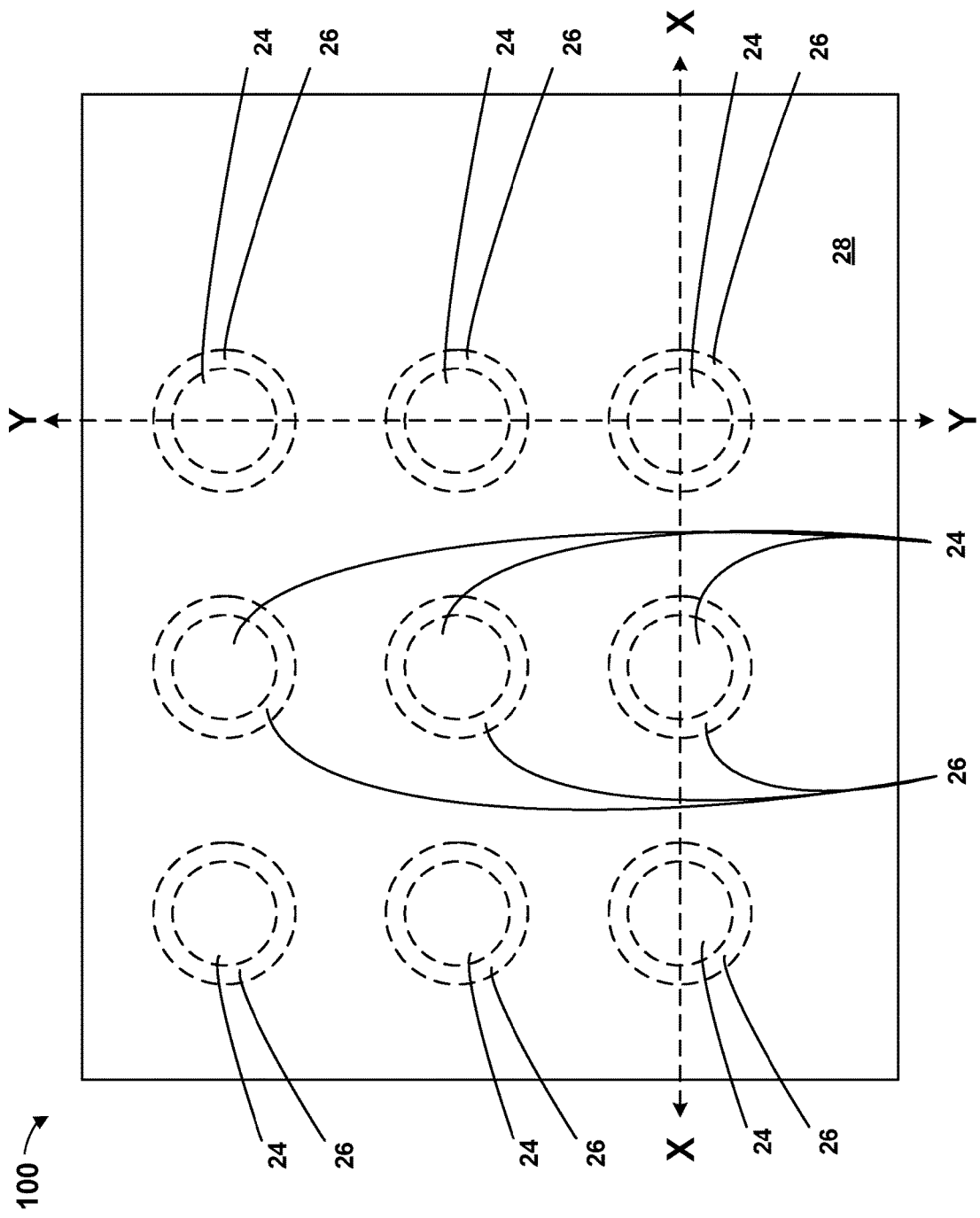
FIG. 2 illustrates a top view of the semiconductor structure, according to an exemplary embodiment.

Referring now to FIG. 1 Section X-X and FIG. 2, a semiconductor structure 100 (hereinafter "structure") at an intermediate stage of fabrication is shown according to an exemplary embodiment. FIG. 1 is a cross-sectional view of the structure 100 along section line X-X. FIG. 2 is a top view of the structure 100.

The structure 100 may include a dielectric 10, a metal line 12, a bottom electrode 16, a reference layer 18, a tunneling barrier layer 20, a free layer 22, a top electrode 24, a liner 26 and a dielectric 28.

The dielectric 10 may include one or more layers. The dielectric 10 may be composed of, for example, silicon oxide (SiOx), silicon nitride (SiNx), silicon boron carbonitride (SiBCN), NBLoK, a low-k dielectric material (with k<4.0), including but not limited to, silicon oxide, spin-on-glass, a flowable oxide, a high density plasma oxide, borophosphosilicate glass (BPSG), or any combination thereof or any other suitable dielectric material.

The metal line 12 may be formed in trenches in the dielectric 10. The metal line 12 can include, for example, copper (Cu), tantalum nitride (TaN), tantalum (Ta), titanium (Ti), titanium nitride (TiN), or a combination thereof. The metal line 12 can be formed by for example, chemical vapor deposition (CVD), physical vapor deposition (PVD), and atomic layer deposition (ALD) or a combination thereof. There may be any number of trenches in the dielectric 10, each filled with the metal line 12, on the structure 100.

A planarization process, such as, for example, chemical mechanical polishing (CMP), may be done to remove excess material from a top surface of the structure 100, such that upper horizontal surfaces of the dielectric 10 and the metal line 12 are coplanar.

There may be one or more MTJ stacks 32, each of the MTJ stacks 32 may include the bottom electrode 16, the reference layer 18, the tunneling barrier layer 20, the free layer 22 and the top electrode 24.

Each of the layers of the MTJ stack 32 may be conformally formed on the structure 100 using known techniques. The bottom electrode 16 may be formed using techniques known in the arts. The bottom electrode 16 may include a material such as cobalt (Co), tungsten (W), copper (Cu), tantalum nitride (TaN), tantalum (Ta), titanium (Ti), titanium nitride (TiN), titanium oxide carbon nitride (TiOCN), tantalum oxide carbon (TaOCN), or a combination of these materials. The bottom electrode 16 can be formed by for example, CVD, PVD and ALD or a combination thereof.

The reference layer 18 is formed on the bottom electrode 16. The tunneling barrier layer 20 is formed on the reference layer 18. In an embodiment, the tunneling barrier layer 20 is a barrier, such as a thin insulating layer or electric potential, between two electrically conducting materials. Electrons (or quasiparticles) pass through the tunneling barrier layer 20 by the process of quantum tunneling. In certain embodiments, the tunneling barrier layer 20 includes at least one sublayer composed of MgO. It should be appreciated that materials other than MgO can be used to form the tunneling barrier layer 20. The free layer 22 is a magnetic free layer that is adjacent to tunneling barrier layer 20 so as to be opposite the reference layer 18. The free layer 22 has a magnetic moment or magnetization that can be flipped. It should also be appreciated that the MTJ stack 32 layers may include additional layers, omit certain layers, and each of the layers may include any number of sublayers. Moreover, the composition of layers and/or sublayers may be different between the different MRAM stacks.

The top electrode 24 may be conformally formed on the free layer 22, using known techniques. The top electrode 24 may be formed and include material as described above for the bottom electrode 16.

The structure 100 may be patterned and etched using known techniques to form the MTJ stack 32. As shown in the Figures, three MTJ stacks 32 are formed, however any number of MTJ stacks 32 may be formed. The MTJ stack 32 may be patterned in one or more steps by lithography and ion beam etch (IBE) or RIE. Aligned vertical portions of the top electrode 24, the free layer 22, the tunneling barrier layer 20, the reference layer 18 and the bottom electrode 16 may be removed selective to the dielectric 10. Remaining vertical portions of the top electrode 24, the free layer 22, the tunneling barrier layer 20, the reference layer 18 and the bottom electrode 16 may form the MTJ stack 32, and may be aligned over the metal line 12.

The liner 26 may be conformally formed on the structure 100, on an exposed upper surface of the dielectric 10, on vertical side surfaces of the free layer 22, the tunneling barrier layer 20, the reference layer 18 and the bottom electrode 16, and on vertical side surfaces and an upper surface of the top electrode 24. The liner 26 may be formed by PVD, ALD, PECVD, among other methods. The material of the liner 26 may include silicon nitride (SiN), aluminum oxide ($AlO_x$), titanium oxide ($TiO_x$), silicon oxide ($SiO_x$), boron nitride (BN), silicon boron carbonitride (SiBCN), or any combination thereof.

In a preferred embodiment, the liner 26 may have an optional pre-treatment with plasma oxygen (O), hydrogen (H), nitrogen (N) or ammonia ($NH_3$), or any combination thereof.

The dielectric 28 may conformally formed on the structure 100, on an exposed upper surface of the liner 26. The dielectric 28 may include one or more layers. The dielectric 28 may be formed and of a material as described for the dielectric 10. A chemical mechanical polishing (CMP) technique may be used to remove excess material and polish upper surfaces of the structure 100.

The resulting structure 100 includes an array of MTJ stacks 32 which are each formed over a metal line 12. An additional metal line, not shown, may be formed in a direction perpendicular to the metal line 12, allowing for a cross point array of word and bit lines for a memory array of the MTJ stacks 32, using the metal line 12 and the additional metal line.

As shown in FIG. 2, dotted lines indicate a lower outline of the top electrode 24 surrounded by the liner 26 in lower layers of the structure 100.

Figure 3:
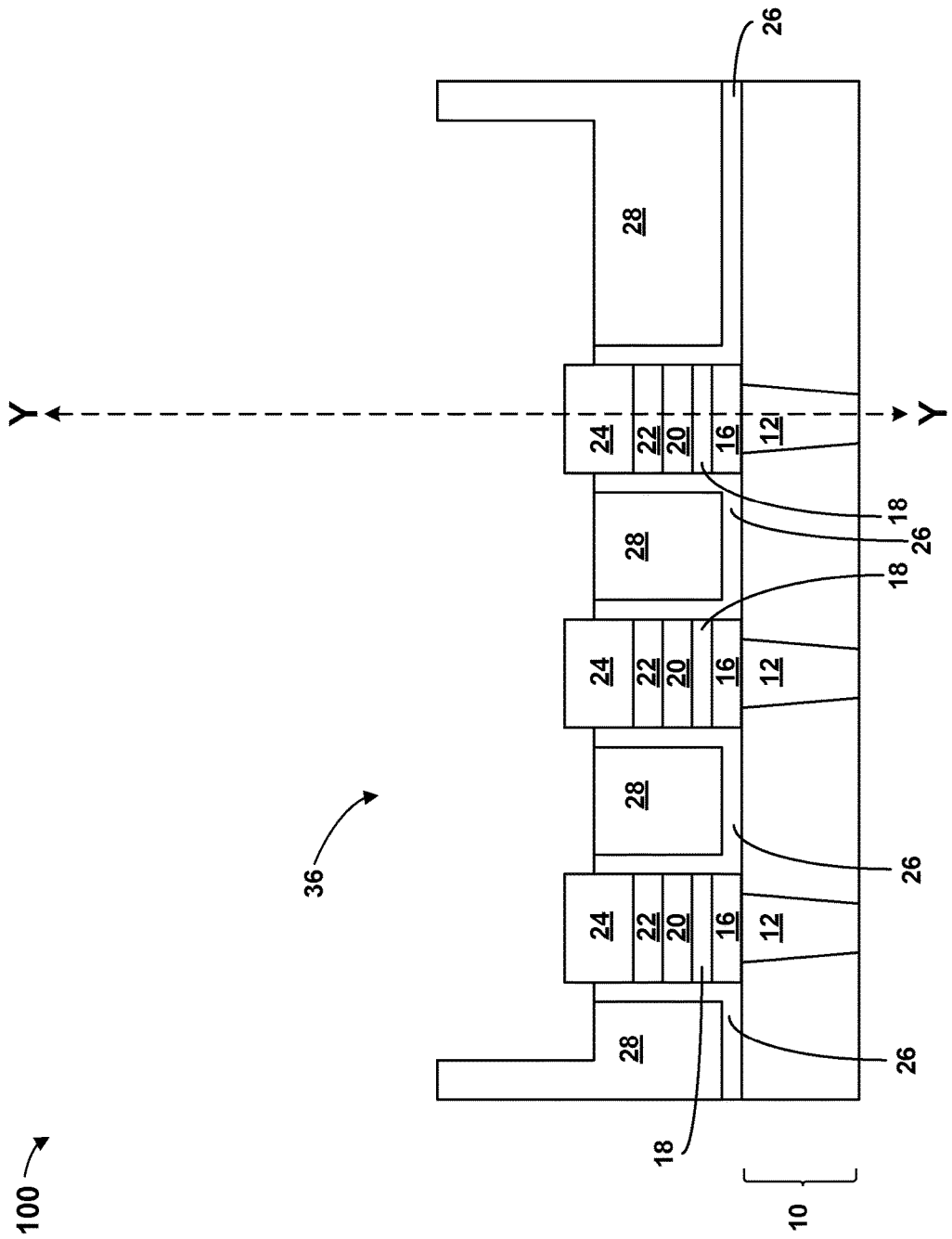
FIG. 3 Section X-X illustrates a cross-sectional view of the semiconductor structure along section line X-X, and illustrates formation of a trench, according to an exemplary embodiment.
Figure 4:
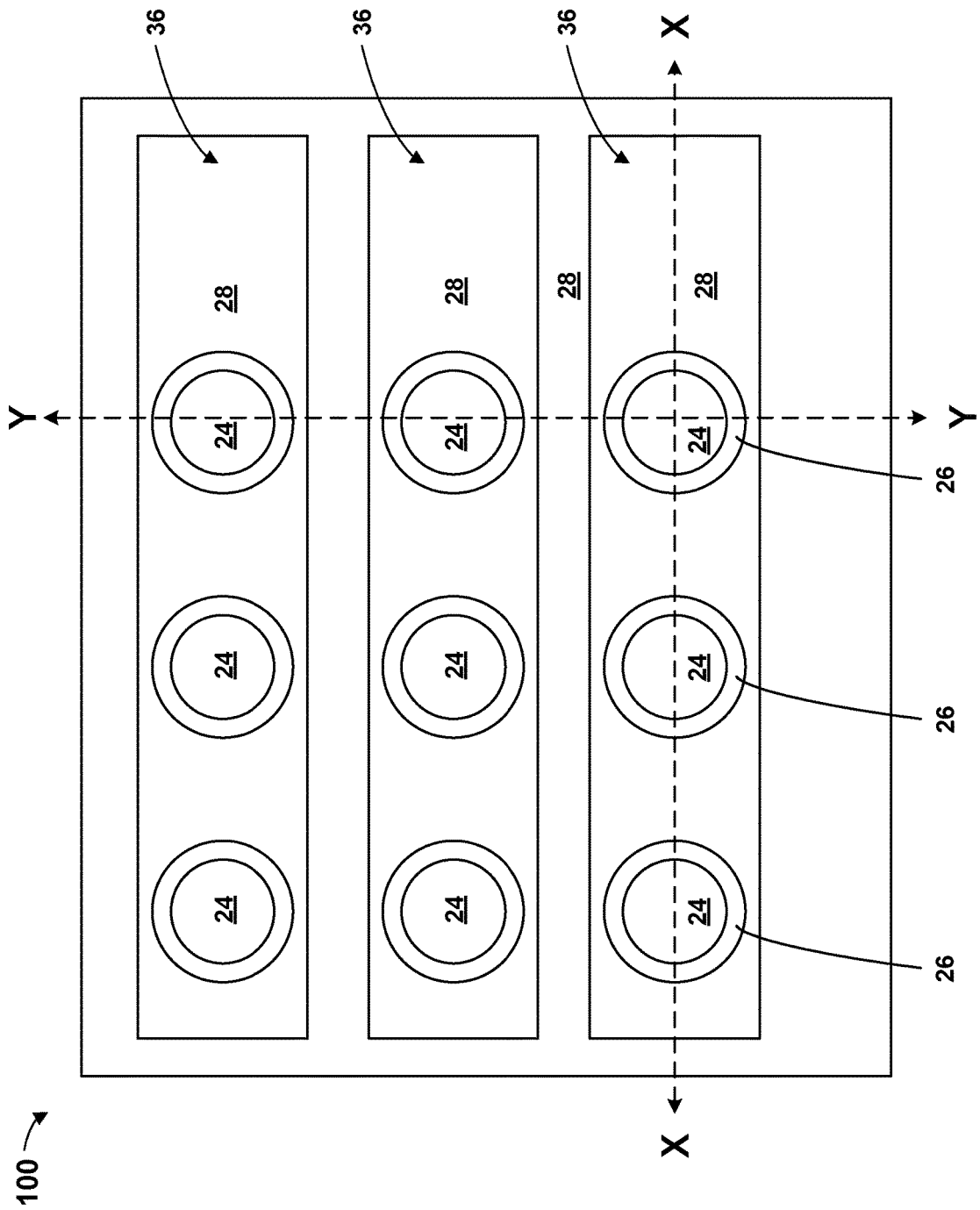
FIG. 4 illustrates a top view of the semiconductor structure, according to an exemplary embodiment.

Referring now to FIG. 3 Section X-X and FIG. 4, the structure 100 is shown according to an exemplary embodiment. FIG. 3 is a cross-sectional view of the structure 100 along section line X-X. FIG. 4 is a top view of the structure 100. A trench 36 may be formed.

The trench 36 may be formed along the section line X-X, and formed by, for example, reactive ion etching (RIE), and stopping when an upper surface of the top electrode 24 is exposed. A portion of the dielectric 28 and a portion of the liner 26 may be removed. The upper surface and a portion of a side surface of the top electrode 24 may be exposed. A portion of an upper surface of the dielectric 28 may be below the upper surface of the top electrode 24. A remaining portion of the upper surface of the dielectric 28 may be above the upper surface of the top electrode 24 outside of the trench 36. An upper surface of the liner 26 may be at a same or similar distance above a substrate as the portion of the upper surface of the dielectric 28. As shown in FIG. 4, there are 3 trenches 36, each of which expose 3 MTJ stacks 32, however any number of trenches 36 may be formed, each exposing any number of MTS stacks 32.

Figure 5:
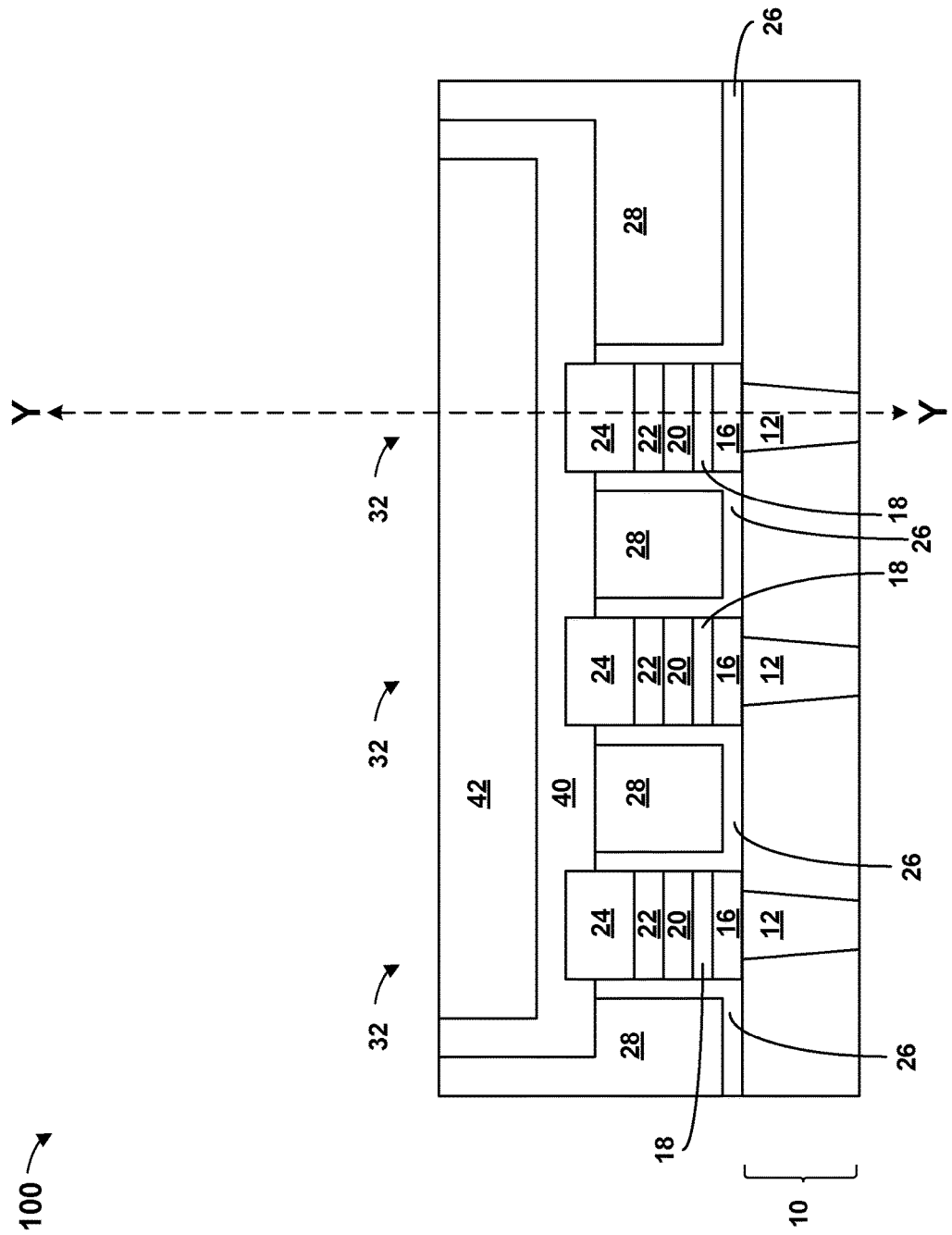
FIG. 5 Section X-X illustrates a cross-sectional view of the semiconductor structure along section line X-X, and illustrates deposition of a metal line and magnetoelectric material in the trench, according to an exemplary embodiment.

Referring now to FIG. 5 Section X-X, the structure 100 is shown according to an exemplary embodiment. FIG. 5 is a cross-sectional view of the structure 100 along section line X-X. A metal line 40 and a magnetoelectric material layer 42 may be formed in the trench 36.

The metal line 40 may be formed in the trench 36, filling a portion of the trench 36. The metal line 40 may be formed as described for the metal line 12. A lower surface of the metal line 40 may cover the upper surface of the top electrode 24. An additional lower surface of the metal line 40 may cover an upper surface of the liner 26 and an upper surface of the dielectric 28. The metal line 40 may cover a lower surface of the trench 36 and may have a vertical portion along a vertical side surface of the trench 36. In an alternate embodiment, the metal line 40 may cover the lower surface of the trench 36 and may have a vertical portion along a portion of the vertical side surface of the trench 36. More specifically, in the alternate embodiment, the metal line 40 may have a single upper surface and may be aligned with a portion of a vertical side surface of the trench 36.

The magnetoelectric material layer 42 may be formed in the trench 36 above the metal line 40, filling a remaining portion of the trench 36. A lower surface of the magnetoelectric material layer 42 may cover an upper surface of the metal line 40. A vertical side surface of the magnetoelectric material layer 42 may be along an inner vertical side surface of the metal line 40. In the alternative embodiment, a vertical side surface of the magnetoelectric material layer 42 may align with a remaining portion of the vertical side surface of the trench 36.

The magnetoelectric material layer 42 may be formed from PVD, ALD, PECVD, among other methods. The material of the magnetoelectric material layer 42 may include GaFe, BTO, Pb(Zr, Ti)O$_3$ (PZT), Pb(Mg, Nb)O$_3$—PbTiO$_3$ (PMN-PT), or any combination thereof.

A planarization process, such as, for example, chemical mechanical polishing (CMP), may be done to remove excess material from a top surface of the structure 100, such that upper horizontal surfaces of the magnetoelectric material layer 42, upper horizontal surfaces of the metal line 40 and upper horizontal surfaces of the dielectric 28 are coplanar. In the alternate embodiment, upper horizontal surfaces of the magnetoelectric material layer 42 and upper horizontal surfaces of the dielectric 28 are coplanar.

Figure 6:
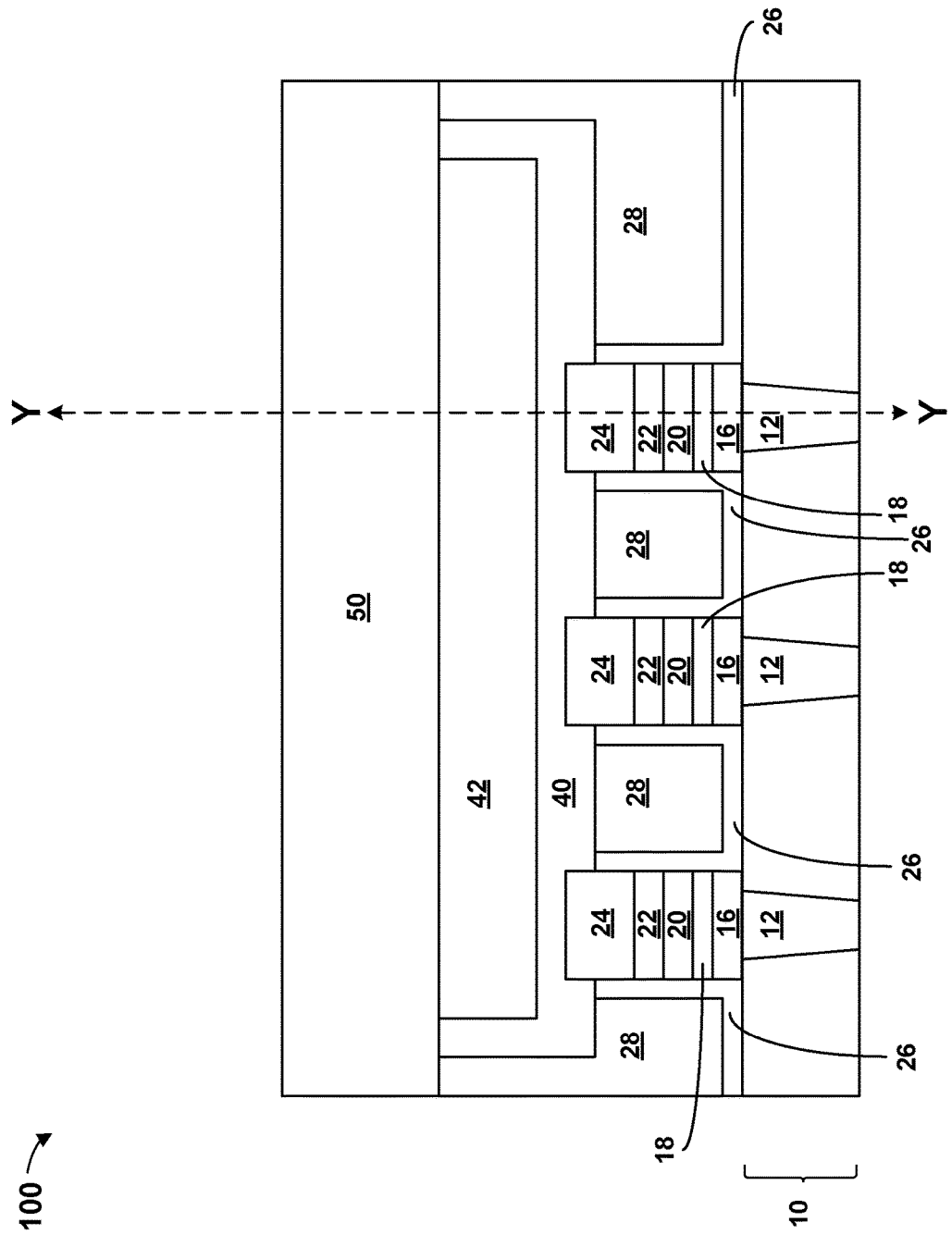
FIG. 6 Section X-X illustrates a cross-sectional view of the semiconductor structure along section X-X, and illustrates deposition of a dielectric, according to an exemplary embodiment.

Referring now to FIG. 6 Section X-X, the structure 100 is shown according to an exemplary embodiment. FIG. 6 is a cross-sectional view of the structure 100 along section line X-X. A dielectric 50 may be formed on the structure 100.

The dielectric 50 may conformally formed on the structure 100, on exposed upper surfaces of the dielectric 28, the magnetoelectric material layer 42 and the metal line 40. In the alternative embodiment, the dielectric 50 may be formed on exposed upper surfaces of the dielectric 28 and the magnetoelectric material layer 42. The dielectric 50 may include one or more layers. The dielectric 50 may be formed and of a material as described for the dielectric 10. A chemical mechanical polishing (CMP) technique may be used to remove excess material and polish upper surfaces of the structure 100.

Figure 7:
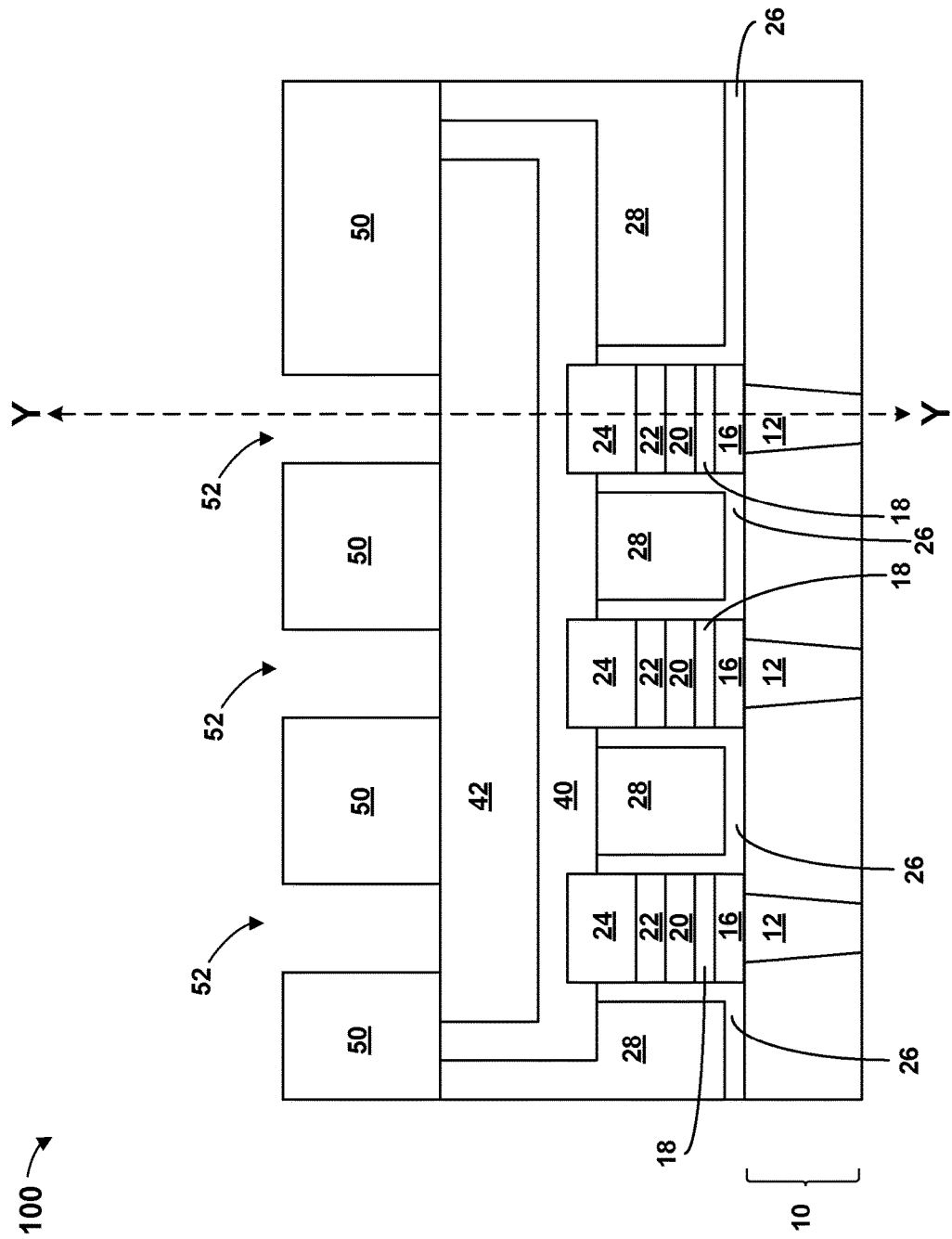
FIG. 7 Section X-X illustrates a cross-sectional view of the semiconductor structure along section line X-X, and illustrates formation of a second trench, according to an exemplary embodiment.
Figure 8:
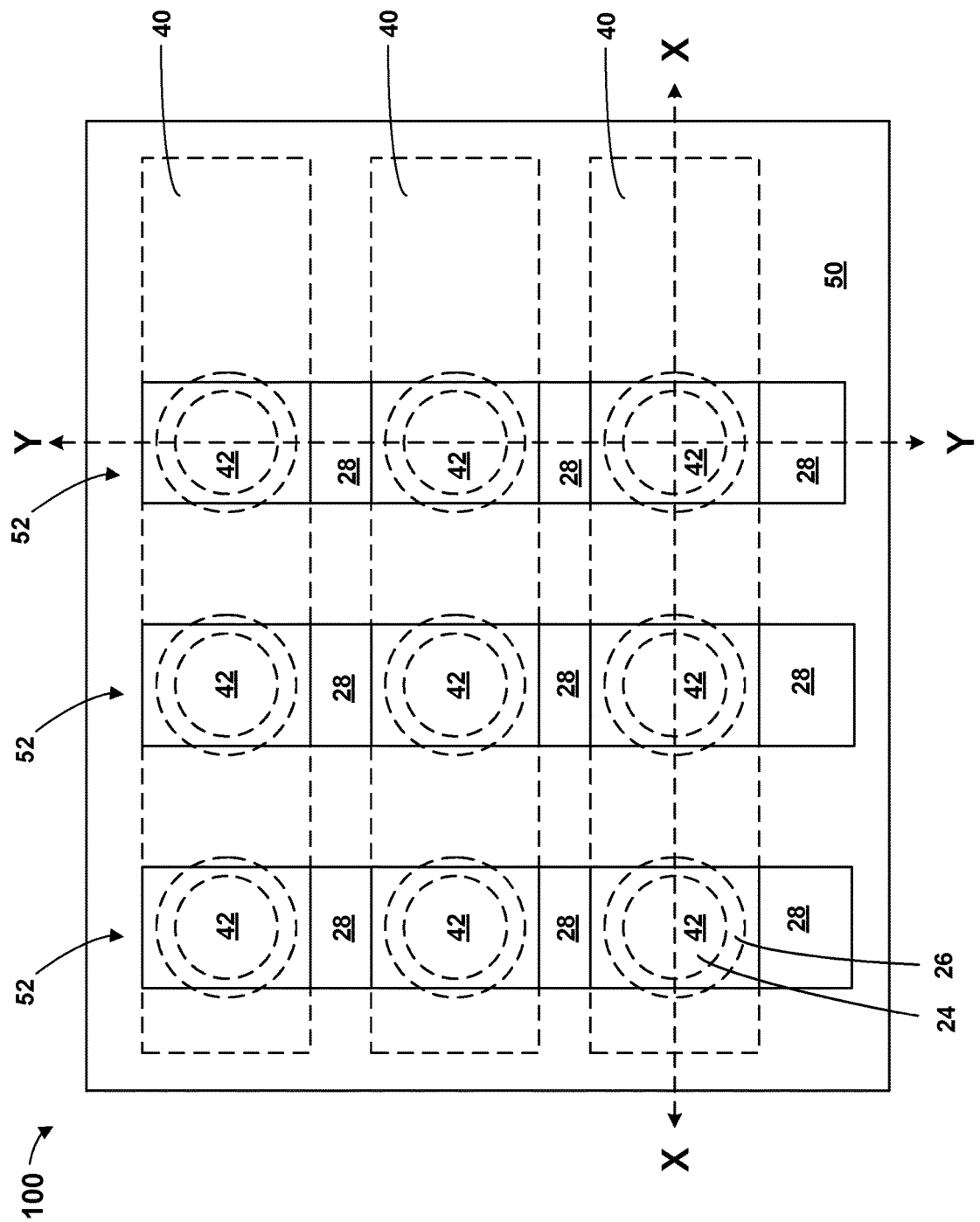
FIG. 8 illustrates a top view of the semiconductor structure, according to an exemplary embodiment.

Referring now to FIG. 7 Section X-X and FIG. 8, the structure 100 is shown according to an exemplary embodiment. FIG. 7 is a cross-sectional view of the structure 100 along section line X-X. FIG. 8 is a top view of the structure 100. A trench 52 may be formed.

The trench 52 may be formed along the section line Y-Y, perpendicular to the section line X-X, and formed by, for example, reactive ion etching (RIE), and stopping when a portion of the magnetoelectric material layer 42 is exposed. A portion of the dielectric 50 may be removed. A portion of an upper surface of the magnetoelectric material layer 42 may be exposed and a portion of an upper surface of the dielectric 28 may be exposed. There are 3 trenches 52 illustrated, however any number of trenches 52 may be formed.

As shown in FIG. 8, dotted lines indicate an outline of the metal line 40 below the magnetoelectric material layer 42 in lower layers of the structure 100. Additionally, dotted lines indicate a lower outline of the top electrode 24 surrounded by the liner 26 in lower layers of the structure 100.

Figure 9:
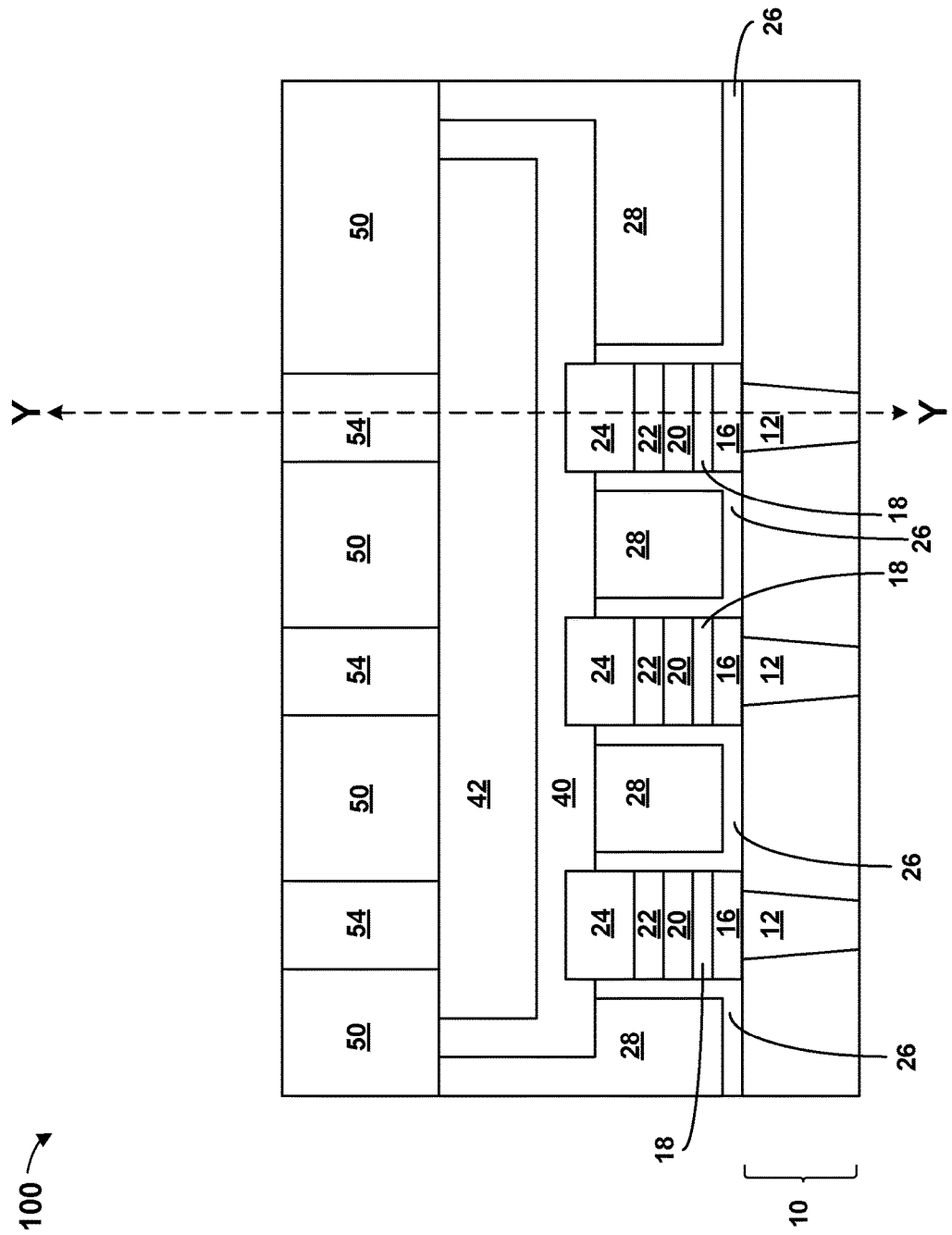
FIG. 9 Section X-X illustrates a cross-sectional view of the semiconductor structure along section line X-X, and illustrates deposition of a metal line and planarization, according to an exemplary embodiment.
Figure 10:
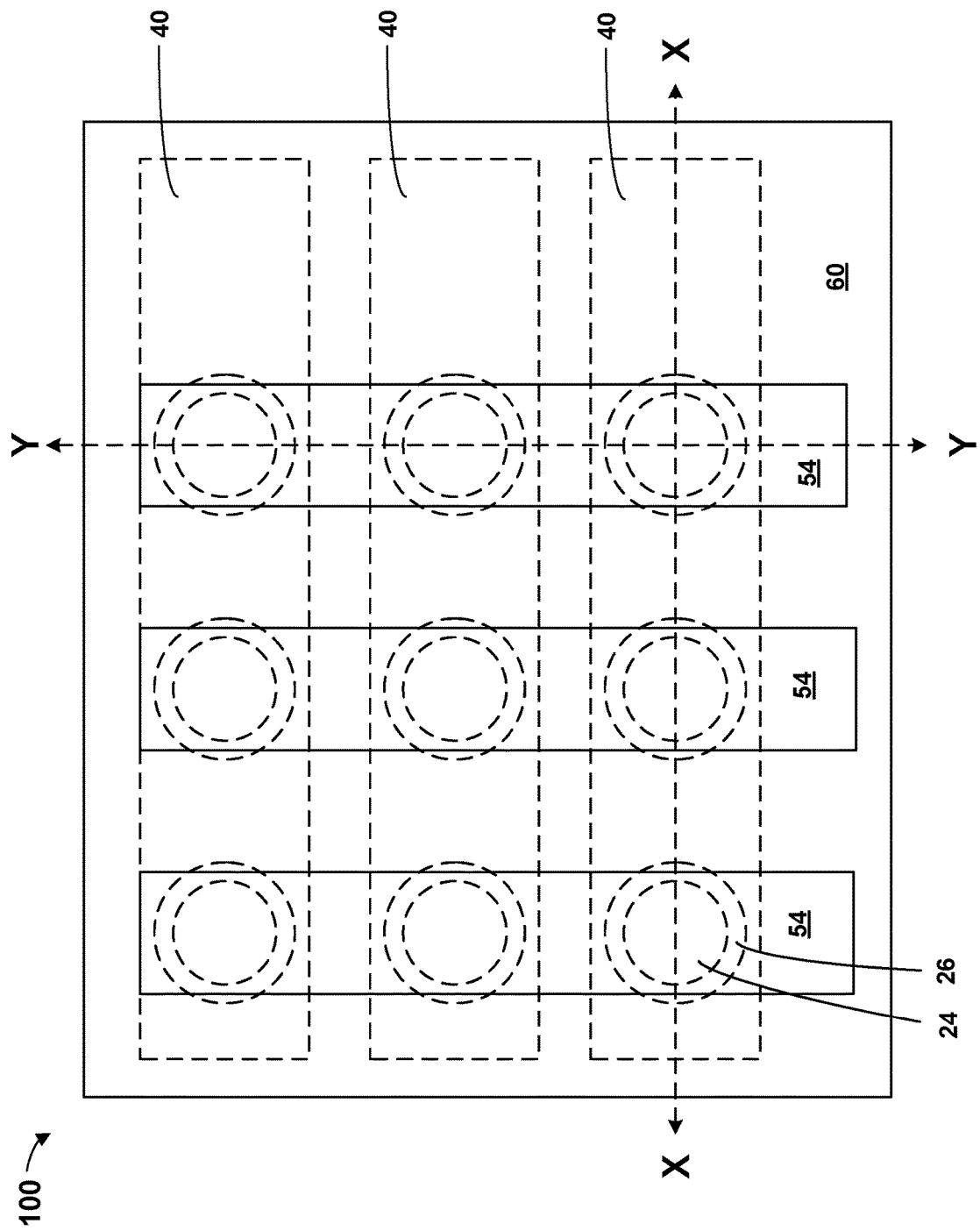
FIG. 10 illustrates a top view of the semiconductor structure, according to an exemplary embodiment.

Referring now to FIG. 9 Section X-X and FIG. 10, the structure 100 is shown according to an exemplary embodiment. FIG. 9 is a cross-sectional view of the structure 100 along section line X-X. FIG. 10 is a top view of the structure 100. A metal line 54 may be formed.

The metal line 54 may be formed in the trench 52, filling the trench 52. The metal line 54 may be formed as described for the metal line 12. A lower surface of the metal line 54 may be cover the exposed portion of the upper surface of the magnetoelectric material layer 42 and the exposed portion of the upper surface of the dielectric 28.

A planarization process, such as, for example, chemical mechanical polishing (CMP), may be done to remove excess material from a top surface of the structure 100, such that upper horizontal surfaces of the dielectric 50 and upper horizontal surfaces of the metal line 54 are coplanar.

As shown in FIG. 10, dotted lines indicate an outline of the metal line 40 below the magnetoelectric material layer 42 in lower layers of the structure 100. Additionally, dotted lines indicate a lower outline of the top electrode 24 surrounded by the liner 26 in lower layers of the structure 100.

Figure 11:
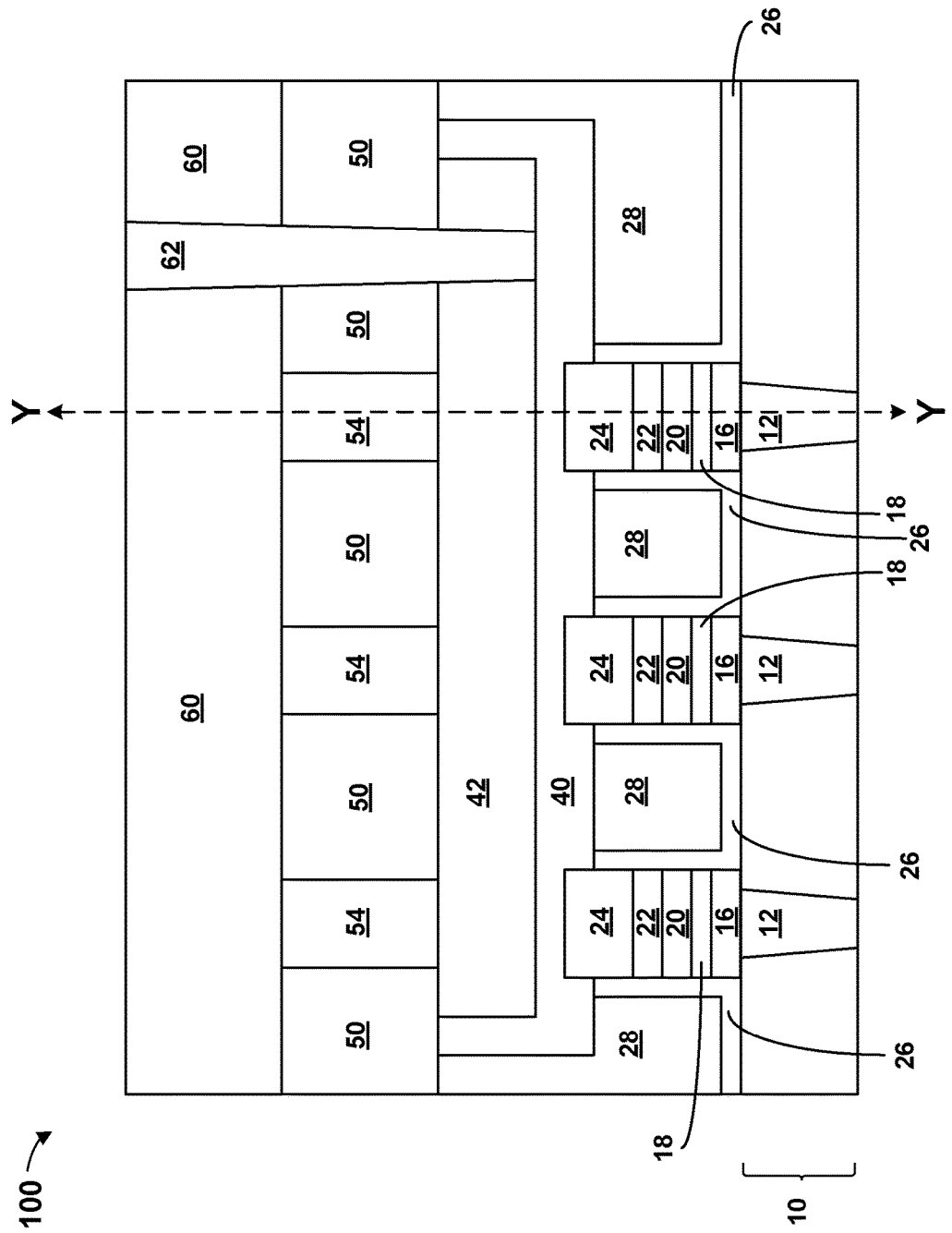
FIG. 11 Section X-X illustrates a cross-sectional view of the semiconductor structure along section line X-X, and illustrates deposition of a dielectric and a contact, according to an exemplary embodiment.
Figure 12:
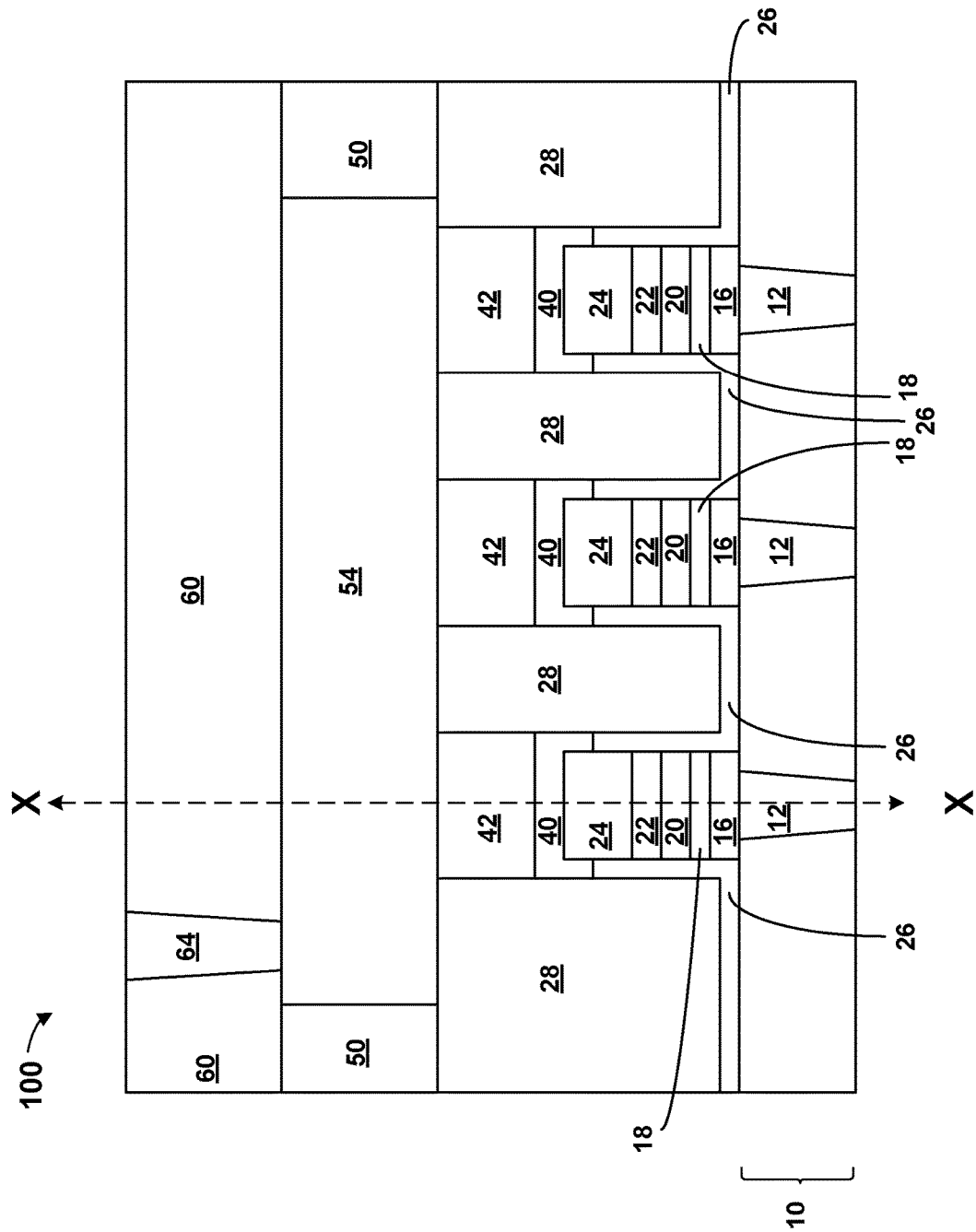
FIG. 12 Section Y-Y illustrates a cross-sectional view of the semiconductor structure along section line Y-Y.
Figure 13:
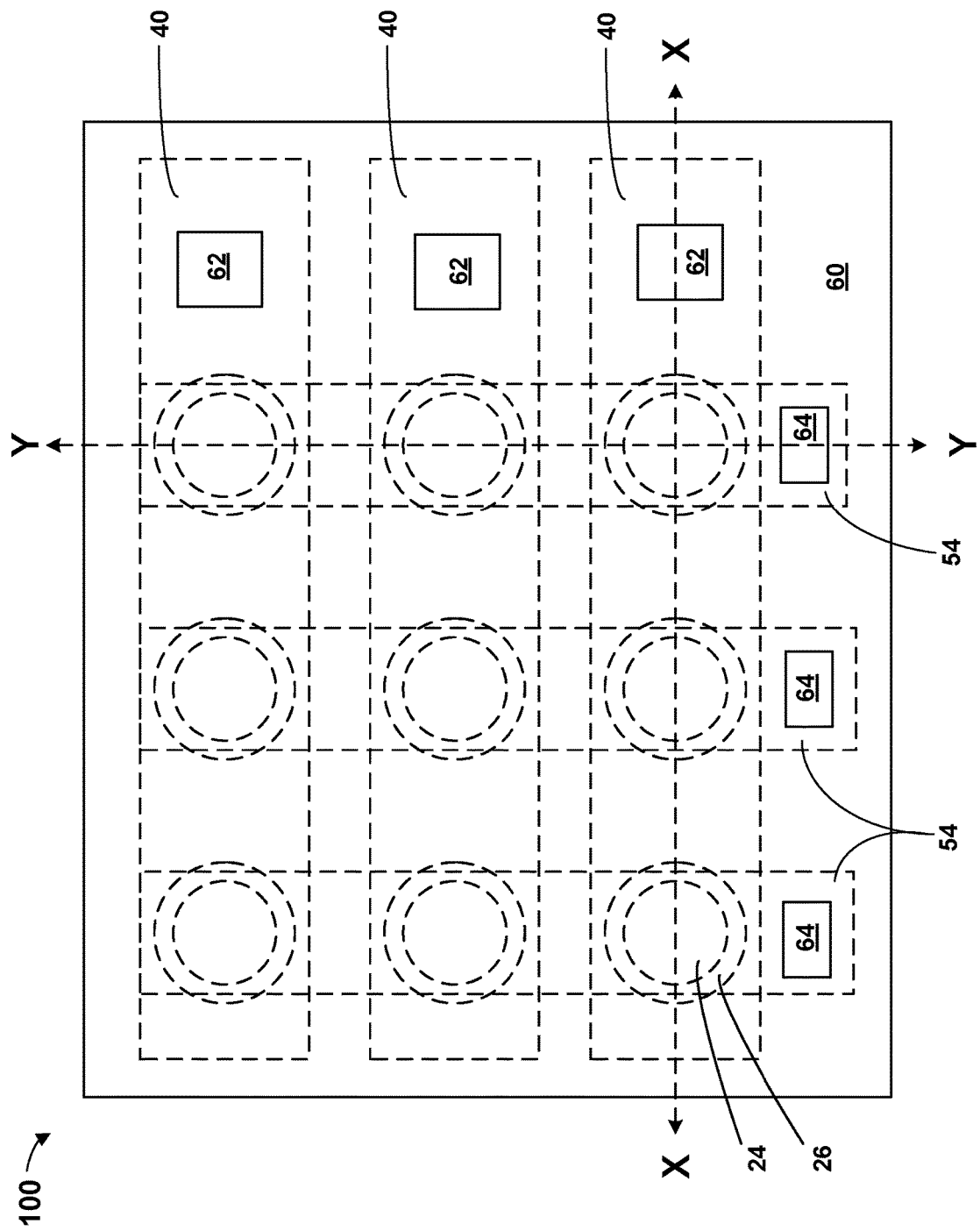
FIG. 13 illustrates a top view of the semiconductor structure, according to an exemplary embodiment.

Referring now to FIG. 11 Section X-X, FIG. 12 Section Y-Y and FIG. 13, the structure 100 is shown according to an exemplary embodiment. FIG. 11 is a cross-sectional view of the structure 100 along section line X-X. FIG. 12 is a cross-sectional view of the structure 100 along section line Y-Y and is perpendicular to section line X-X. FIG. 13 is a top view of the structure 100. A dielectric 60 may be formed. A first contact 62 may be formed and a second contact 64 may be formed.

The dielectric 60 may conformally formed on the structure 100, on exposed upper surfaces of the dielectric 50 and the metal line 54. The dielectric 60 may include one or more layers. The dielectric 60 may be formed and of a material as described for the dielectric 10. A chemical mechanical polishing (CMP) technique may be used to remove excess material and polish upper surfaces of the structure 100.

A first opening, not shown, may be formed by methods known in the art, such as a directional etch, for example an anisotropic vertical etch process such as reactive ion etch (RIE) and the contact 62 formed in the first opening. The contact 62 may provide physical and electrical connection to the metal line 40, which is below the magnetoelectric material layer 42.

The contact 62 may include a first liner in the first opening, not shown, which may be deposited using typical deposition techniques, for example, atomic layer deposition (ALD), molecular layer deposition (MLD), chemical vapor deposition (CVD), physical vapor deposition (PVD), and spin on techniques. In an embodiment, the first liner, not shown, may include titanium nitride (TiN) deposited using a chemical vapor deposition technique. In an embodiment, the first liner of the contact 62 may include one or more layers. The first liner of the contact 62 may be conformally formed on exposed surfaces of the dielectric 60, the dielectric 50, the magnetoelectric material layer 42 and the metal line 40. In an embodiment, the first liner of the contact 62, may have a thickness, about 3 nm to 20 nm, and ranges there between, although a thickness less than 3 nm and greater than 20 nm may be acceptable.

The contact 62 may include conducting material, such as a metal. In an embodiment, the contact 62 may be tungsten (W), and may be deposited using typical deposition techniques, for example, atomic layer deposition (ALD), molecular layer deposition (MLD), chemical vapor deposition (CVD), physical vapor deposition (PVD), and spin on techniques.

A second opening, not shown, may be formed by methods known in the art, such as a directional etch, for example an anisotropic vertical etch process such as reactive ion etch (RIE) and the contact 64 formed in the second opening. The contact 64 may provide physical and electrical connection to the metal line 54, which is above the magnetoelectric material layer 42.

The contact 64 may include a second liner in the second opening, not shown, formed of a material and as described of the first liner. The second liner, not shown, may be conformally formed on exposed surfaces of the dielectric 60 and the metal line 54. The contact 64 may be formed and of a material as described for the contact 62.

The first liner (not shown), the contact 62, the second liner (not shown) and the contact 64 may be polished using a chemical mechanical polishing (CMP) technique until a top surface of the first liner (not shown), the contact 62, the second liner (not shown) and the contact 64 are substantially coplanar with a top surface of the dielectric 60.

As shown in FIG. 13, there are 3 contacts 62, each of which are connected to the metal line 40, which is below the magnetoelectric material layer 42, along the section line X-X. There are 3 contacts 64, each of which are connected to the metal line 54, which is above the magnetoelectric material layer 42, along the section line Y-Y. There may be any number of contacts 62 and any number of contacts 64. An array of the metal lines 42, 54, and the contacts 62, 64 are arranged to provide contact to a portion of the magnetoelectric material layer 42 above each individual MTJ stack 32, to control an individual magnetic field above each individual MTJ stack 32 and provide a local magnetoelectric assist element.

In an alternate embodiment, the array of the metal lines 42, 54, and the contacts 62, 64 are below each individual MTJ stack 32, to control the individual magnetic field below each individual MTJ stack 32 and provide a local magnetoelectric assist element.

The resulting MTJ structure with a magnetoelectric assist includes an MTJ memory structure with an additional structure of a magnetoelectric material layer 42 arranged within a crossbar of the metal lines 42, 54 above an array of MTJ memory structures. A voltage on the metal lines 42, 54 can generate a magnetic field at each cross point of an individual MTJ stack 32 to bias the magnetoelectric material layer 42 and assist in switching a polarity of a magnetic free layer in the MTJ stack 32 to write one of two memory states to the MTJ stack 32.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A semiconductor device comprising:
   a magnetic tunnel junction (MTJ) stack;
   a first metal line above the MTJ stack, wherein the first metal line is connected physically and electrically to a top electrode of the MTJ stack; and
   a magnetoelectric material layer above the first metal line.

2. The semiconductor device according to claim 1, further comprising:
   an array, wherein the array includes a plurality of the MTJ stack;
   the first metal line connected physically and electrically to a top electrode of a row of the MTJ stacks.

3. The semiconductor device according to claim 1, further comprising:
   a second metal line above the magnetoelectric material layer, perpendicular to the first metal line.

4. The semiconductor device according to claim 3, further comprising:
   a first contact to the first metal line; and
   a second contact to the second metal line.

5. The semiconductor device according to claim 3, further comprising:
   a magnetic field above the MTJ stack controlled by a voltage between the first metal line and the second metal line.

6. A semiconductor device comprising:
   an array of magnetic tunnel junction (MTJ) stacks;
   a first metal line connected physically and electrically to a top electrode of each MTJ stack in a row of the array of MTJ stacks; and
   a magnetoelectric material layer above the first metal line, connected physically and electrically to the first metal line.

7. The semiconductor device according to claim 6, further comprising:
   a second metal line above the magnetoelectric material layer, perpendicular to the first metal line, connected physically and electrically to the magnetoelectric material layer only where an MTJ stack of the array of MTJ stacks is arranged vertically below the second metal line.

8. The semiconductor device according to claim 7, further comprising:
   a first contact to the first metal line; and
   a second contact to the second metal line.

9. The semiconductor device according to claim 7, further comprising:
   a magnetic field above a first MTJ stack of the array of MTJ stacks controlled by a voltage between the first metal line and the second metal line which intersect above the first MTJ stack.

10. A semiconductor device comprising:
    an array of magnetic tunnel junction (MTJ) stacks;

a first metal line connected physically and electrically to a top electrode of each MTJ stack in a row of the array of MTJ stacks, wherein the first metal line wraps around the top electrode of each MTJ stack in the row of the array of MTJ stacks; and a magnetoelectric material layer above the first metal line, connected physically and electrically to the first metal line.

11. The semiconductor device according to claim 10, further comprising:

a second metal line above the magnetoelectric material layer, perpendicular to the first metal line, connected physically and electrically to the magnetoelectric material layer only where an MTJ stack of the array of MTJ stacks is arranged vertically below the second metal line.

12. The semiconductor device according to claim 11, further comprising:

a first contact to the first metal line; and a second contact to the second metal line.

13. The semiconductor device according to claim 11, further comprising:

a magnetic field above a first MTJ stack of the array of MTJ stacks controlled by a voltage between the first metal line and the second metal line which intersect above the first MTJ stack.

14. The semiconductor device according to claim 10, wherein the first metal line wraps around the top electrode of each MTJ stack to contact a top surface and a side surface of each top electrode.

* * * * *